(12) United States Patent
Yoshino

(10) Patent No.: US 11,148,608 B2
(45) Date of Patent: Oct. 19, 2021

(54) WINDSCREEN AND MICROPHONE DEVICE

(71) Applicant: AUDIO-TECHNICA CORPORATION, Tokyo (JP)

(72) Inventor: Satoshi Yoshino, Tokyo (JP)

(73) Assignee: AUDIO-TECHNICA CORPORATION, Tokyo (JP)

(*) Notice: Subject to any disclaimer, the term of this patent is extended or adjusted under 35 U.S.C. 154(b) by 0 days.

(21) Appl. No.: 17/049,632

(22) PCT Filed: Oct. 19, 2018

(86) PCT No.: PCT/JP2018/038961
§ 371 (c)(1),
(2) Date: Oct. 22, 2020

(87) PCT Pub. No.: WO2019/207820
PCT Pub. Date: Oct. 31, 2019

(65) Prior Publication Data
US 2021/0245675 A1    Aug. 12, 2021

(30) Foreign Application Priority Data

Apr. 23, 2018   (JP) .............................. JP2018-081978

(51) Int. Cl.
*B60R 11/02* (2006.01)
*H04R 1/02* (2006.01)
*H04R 1/08* (2006.01)

(52) U.S. Cl.
CPC .......... *B60R 11/0247* (2013.01); *H04R 1/025* (2013.01); *H04R 1/08* (2013.01); *H04R 2499/13* (2013.01)

(58) Field of Classification Search
CPC ....... B60R 11/0247; H04R 1/025; H04R 1/08; H04R 2499/13
(Continued)

(56) References Cited

U.S. PATENT DOCUMENTS 3,154,171 A * 10/1964 Knutson ................ H04R 1/086
181/158
5,550,925 A * 8/1996 Hori ........................ H03G 5/165
381/98
(Continued)

FOREIGN PATENT DOCUMENTS

JP          9-93680 A      4/1997
JP     2005-347984 A     12/2005
(Continued)

*Primary Examiner* — Sean H Nguyen
(74) *Attorney, Agent, or Firm* — W&C IP

(57) ABSTRACT

A windscreen with good visibility of light from a light emitting part and a microphone device are provided.
The windscreen 20 according to the present invention is a windscreen attached to a microphone 10 including a sound collecting part 111 and 114 configured to collect sound, and a light emitting display part 116 configured to indicate an operation state of the sound collecting part. The windscreen includes a windscreen body 21 that covers the sound collecting part, and a fixing member 22 that fixes the windscreen body to the microphone. The windscreen body includes an insertion hole 21*h* in which the sound collecting part is disposed. The fixing member includes a light guide part 221 that is disposed outside the insertion hole. The light guide part guides light from the light emitting part.

11 Claims, 8 Drawing Sheets

(58) Field of Classification Search
USPC .......................................................... 381/86
See application file for complete search history.

(56) References Cited

U.S. PATENT DOCUMENTS

| 6,614,911 | B1 * | 9/2003 | Watson | ..................... | B60R 1/12 |
| | | | | | 381/111 |
| 2014/0126756 | A1 * | 5/2014 | Gauger, Jr. | ............ | H04R 5/027 |
| | | | | | 381/309 |

FOREIGN PATENT DOCUMENTS

| JP | 2012-175379 A | 9/2012 |
| JP | 2015-207800 A | 11/2015 |
| JP | 2016-2011583 A | 12/2016 |

* cited by examiner

WINDSCREEN AND MICROPHONE DEVICE

TECHNICAL FIELD

The present invention relates to a windscreen and a microphone device.

BACKGROUND ART

A microphone among microphones, such as a microphone for conferences, includes a light emitting part (light emitting diode (LED)) that indicates an operation state of the microphone (states of the microphone such as on/off of its power) for a participant of a conference and/or a speaker itself (for example, see Japanese Unexamined Patent Publication No. 2016-201583).

A microphone disclosed in Japanese Unexamined Patent Publication No. 2016-201583 includes a light emitting part (LED) that indicates an operation state of the microphone, a cover that diffuses light from the light emitting part toward the outside. The light emitting part is disposed at a position visible to a participant of a conference, such as a part at the tip side (a side of a speaker (sound source)) of the microphone. The microphone disclosed in Japanese Unexamined Patent Publication No. 2016-201583 indicates the operation state of the microphone for the participant and/or the speaker itself by diffusing the light from the LED toward the outside via the cover.

The microphone for conferences is likely to be used near a mouth of a speaker. Therefore, when sound such as "P" and "T" is pronounced by the speaker, a diaphragm strongly vibrates due to its sound pressure, and accordingly so-called pop noise is generated.

In order to reduce such pop noise, the microphone for conferences is used by attaching a windscreen constituted with a metal mesh, an open cell foam, or the like such that a sound collecting part is covered by the windscreen (for example, see Japanese Unexamined Patent Publication No. 2005-347984).

SUMMARY OF INVENTION

Technical Problem

As described above, in the microphone with the light emitting part, the light emitting part is disposed near the sound collecting part of the microphone (a part at the tip side of the microphone). Therefore, when the windscreen is attached to the microphone including the light emitting part, the light emitting part is covered and hidden by the windscreen, and accordingly the participant of the conference and/or the speaker are unable to visually recognize the light from the light emitting part. On the other hand, when a windscreen having a size (length) not to cover the light emitting part, the participant of the conference can visually recognize the light from the light emitting part. However, when the microphone is directed to the speaker, the speaker cannot visually recognize the light from the light emitting part due to the windscreen. Further, increasing the size of the light emitting part to improve the visibility of the light from the light emitting part from the speaker hinders miniaturization of the microphone, and impairs the design of the microphone.

An object of the present invention is to solve the problem described above and to provide a windscreen with good visibility of light from a light emitting part and a microphone device.

Solution to Problem

The windscreen according to the present invention is a windscreen attached to a microphone including a sound collecting part configured to collect sound, and a light emitting part configured to indicate an operation state of the sound collecting part. The windscreen includes the windscreen body that covers the sound collecting part, and a fixing member that fixes the windscreen body to the microphone. The windscreen body includes an insertion hole in which the sound collecting part is disposed. The fixing member includes a light guide part that is disposed outside the insertion hole. The light guide part guides light from the light emitting part.

Advantageous Effects of Invention

According to the present invention, a windscreen with good visibility of light from a light emitting part and a microphone device can be provided.

DESCRIPTION OF EMBODIMENTS

Embodiments of a microphone device and a windscreen according to the present invention will now be described with reference to the attached drawings.

Microphone Device
Configuration of Microphone Device

Figure 1:
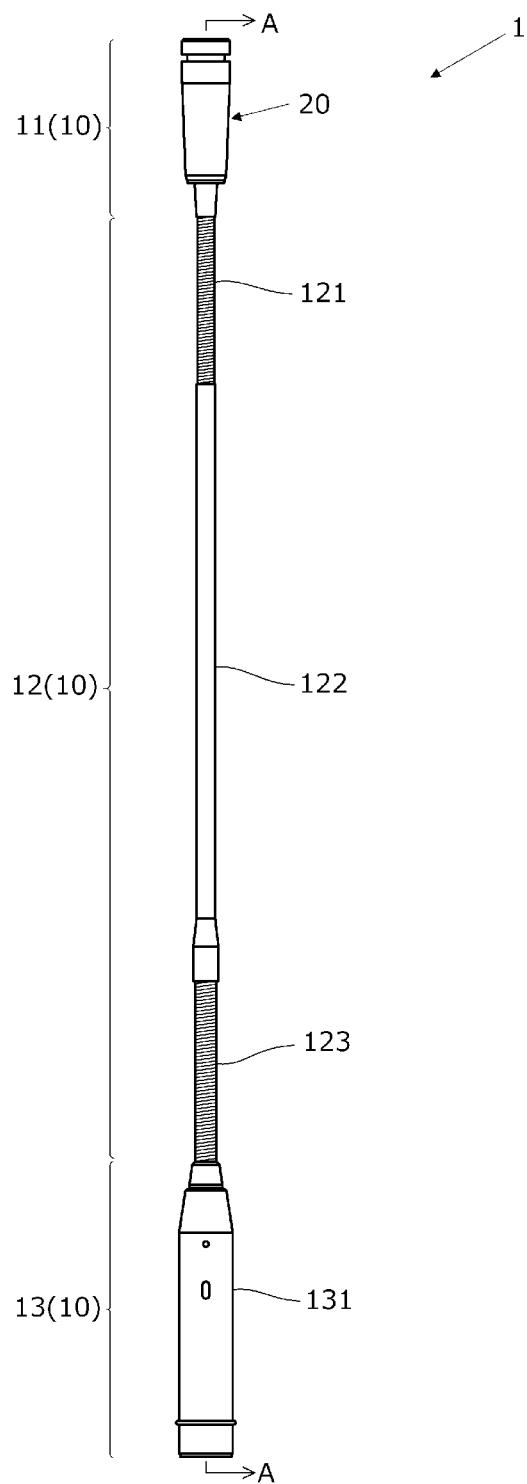
FIG. 1 is an external view illustrating an embodiment of a microphone device according to the present invention.

FIG. 1 is an external view illustrating an embodiment of a microphone device according to the present invention.

The microphone device 1 collects a sound wave from a sound source (not illustrated) and outputs an electrical signal corresponding to the sound wave. The microphone device 1 includes a microphone 10 and a windscreen 20.

In the following description, the direction to the upper side in FIG. 1 is referred to as the upper direction, and the direction to the lower side in FIG. 1 is referred to as the lower direction.

Configuration of Microphone

The microphone 10 collects the sound wave from the sound source and outputs the electrical signal corresponding to the sound wave. The microphone 10 is, for example, a gooseneck type microphone which is detachably attached to a microphone stand (not illustrated) in a conference room or the like. The microphone 10 includes a unit part 11, an adjustment part 12, and a connection part 13.

Figure 2:
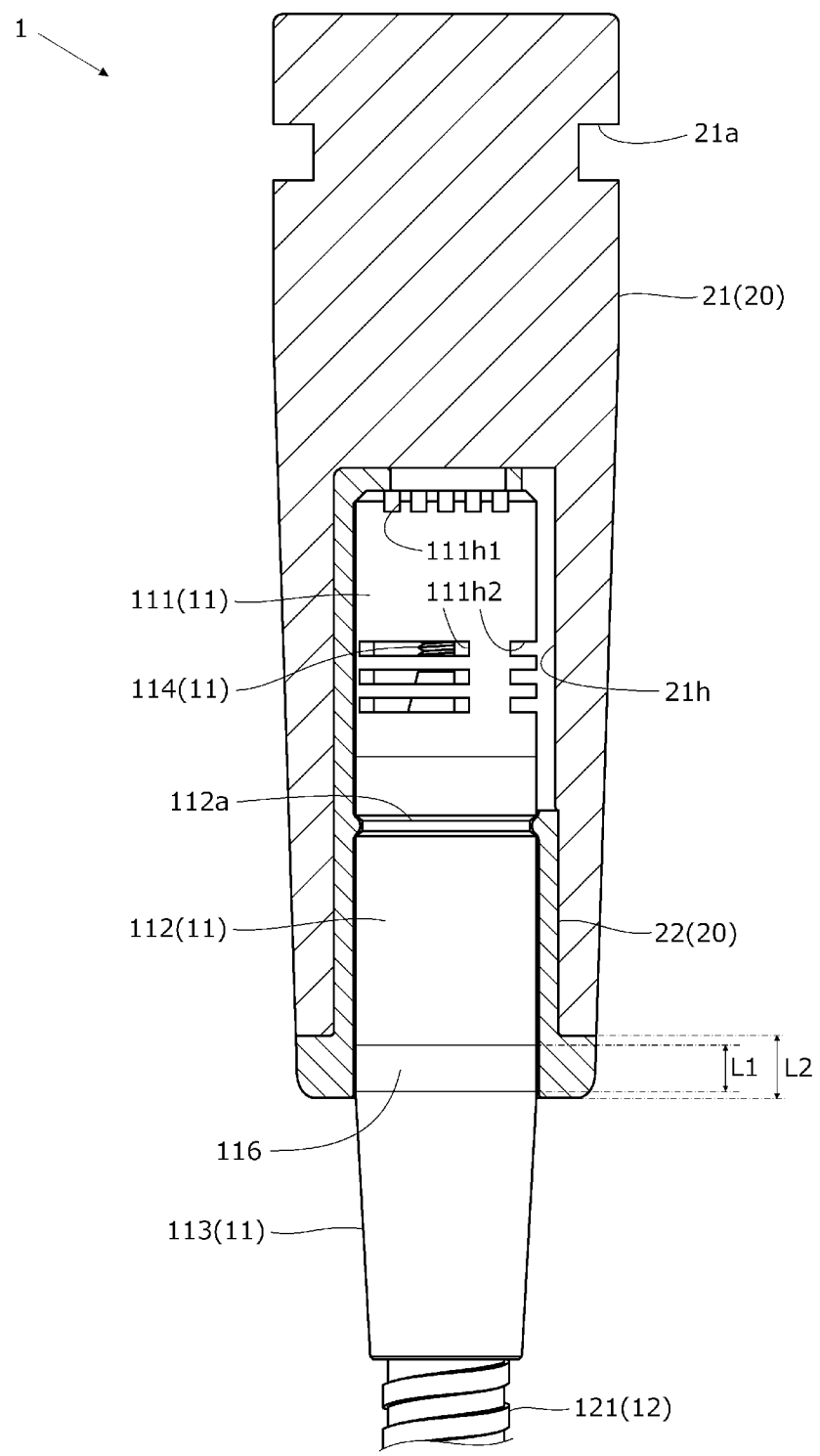
FIG. 2 is a partially enlarged cross-sectional view of the microphone device taken along line A-A in FIG. 1.

FIG. 2 is a partially enlarged cross-sectional view of the microphone device 1 taken along line A-A in FIG. 1.

FIG. 2 illustrates a nonsectional view of the microphone 10 and a cross-sectional view of the windscreen 20.

The unit part 11 is directed to the sound source and collects sound waves from the sound source. The unit part 11 includes a first case 111, a second case 112, a third case 113, a microphone unit 114, a circuit board 115 (see FIG. 7), and a light emitting display part 116. The first case 111 and the microphone unit 114 constitute a sound collecting part that collects sound in the present invention.

The first case 111 accommodates a microphone unit 114. The first case 111 is made of metal and has a bottomed cylindrical shape. The first case 111 includes first sound wave introduction ports 111$h$1 and second sound wave introduction ports 111$h$2. Each of the first sound wave introduction ports 111$h$1 and the second sound wave introduction ports 111$h$2 introduces the sound wave from the sound source into the microphone unit 114. Each of the first sound wave introduction ports 111$h$1 and the second sound wave introduction ports 111$h$2 is constituted with a plurality of holes having a slit shape. The first sound wave introduction ports 111$h$1 are disposed on an upper end surface (bottom surface) of the first case 111. The second sound wave introduction ports 111$h$2 are disposed at three positions on the outer circumferential surface of the first case 111 at an equal angular interval (at the interval of 120 degrees in this embodiment) in the circumferential direction of the first case 111.

The second case 112 accommodates the circuit board 115 and the light emitting display part 116. The second case 112 is made of metal and has a cylindrical shape. The second case 112 includes a fitting groove 112$a$. The fitting groove 112$a$ is a groove to which fitting parts 233$a$-233$c$ (see FIG. 4) of the windscreen 20 described below are fitted. The fitting groove 112$a$ is disposed on the outer circumferential surface of the second case 112 (the outer circumferential surface of the microphone 10) in a ring shape along the circumferential direction of the outer circumferential surface.

The third case 113 accommodates the upper end of the adjusting part 12 (a first flexible pipe 121 described below). The third case 113 is made of metal and has a hollow circular truncated cone shape tapered toward the lower end.

The microphone unit 114 collects sound waves introduced from each of the first sound wave introduction ports 111$h$1 and the second sound wave introduction ports 111$h$2 to the first case 111, and converts the sound waves into electrical signals. The microphone unit 114 is, for example, a condenser-type electroacoustic transducer. The microphone unit 114 is accommodated in the first case 111.

Note that the microphone unit is not limited to a condenser-type electroacoustic transducer. That is, for example, the microphone unit may be a dynamic-type electroacoustic transducer.

The circuit board 115 (see FIG. 7) is mounted with a circuit such as a balanced transmission circuit (not illustrated) that outputs the sound signal from the microphone unit 114 to an output connector (not illustrated), and an element such as LED (Light Emitting Diode) 115$a$ and 115$b$ (see FIG. 7; the same applies hereinafter) that indicate the operation state of the sound collecting part. The circuit board 115 is accommodated in the second case 112.

The "operation state of the sound collecting part" includes a state in which the power of the microphone 10 is on (a state in which the microphone unit 114 is able to collect sound waves) and a state in which the power of the microphone 10 is off (a state in which the microphone unit 114 is unable to collect sound waves).

The light emitting display part 116 displays (indicates) the light from LEDs 115$a$ and 115$b$ to the outside of the unit part 11. The light emitting display part 116 is made of, for example, a translucent resin such as polymethyl methacrylate (PMMA). The light emitting display part 116 has a ring shape. The light emitting display part 116 substantially uniformly radiates the light from LEDs 115$a$ and 115$b$ to the outside when LEDs 115$a$ and 115$b$ emit light, and stops radiating the light from LEDs 115$a$ and 115$b$ when LEDs 115$a$ and 115$b$ stop emitting light. The light emitting display part 116 is accommodated in the second case 112.

The first case 111 is connected to the second case 112. The second case 112 is connected to the third case 113. In this state, a part of the outer peripheral surface of the light emitting display part 116 is held between the second case 112 and the third case 113, being exposed to the outside of the unit part 11 in a ring shape. That is, the part of the light emitting display part 116 exposed to the outside of the unit part 11 functions as a light emitting part in the present invention that indicates the operation state of the sound collecting part. In this state, the outer diameter of the part of the light emitting display part 116 exposed to the outside of the unit part 11 (hereinafter, also referred to as "light emitting display part 116") is the same as the outer diameter of the second case part 112 and the outer diameter of the upper end part of the third case part 113.

Referring now back to FIG. 1, the adjusting part 12 couples the unit part 11 with the connecting part 13, and adjusts the position of the unit part 11 with respect to the connecting part 13. The adjusting part 12 includes a first flexible pipe 121, a joint 122, and a second flexible pipe 123.

The first flexible pipe 121 and the second flexible pipe 123 is bent to adjust the position of the unit part 11. The joint 122 couples the first flexible pipe 121 with the second flexible pipe 123.

The connection part 13 connects microphone 10 to a microphone stand (not illustrated). The connecting part 13 includes a connector case 131 and an output connector (not illustrated).

The connector case 131 accommodates the output connector and a lower end of the adjusting part 12 (the second flexible pipe 123). The connector case 131 is made of metal and has a substantially cylindrical shape.

The output connector outputs a sound signal from the circuit board 115. The output connector is, for example, a pin plug conforming to JEITA standard RC-5236 "Circular Connectors, Latch Lock Type for Audio Equipment."

Configuration of Windscreen

Figure 3:
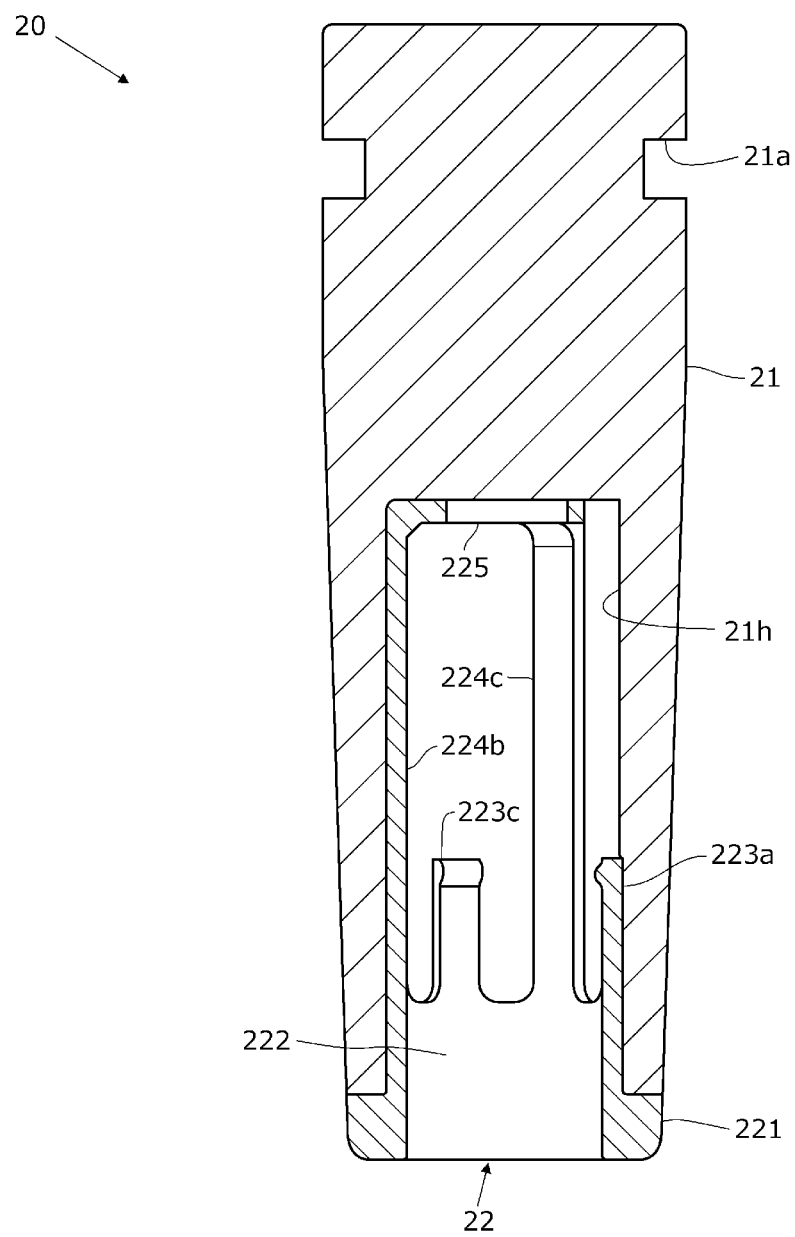
FIG. 3 is a cross-sectional view taken along line A-A in FIG. 1 illustrating an embodiment of a windscreen according to the present invention.

FIG. 3 is a cross-sectional view taken along line A-A in FIG. 1 illustrating an embodiment of the windscreen according to the present invention.

The windscreen 20 reduces the generation of pop noise with the sound collecting part by protecting the sound collecting part (microphone unit 114) from wind from the outside of the microphone device 1 or from exhalation of a user (speaker) of the microphone device 1. The windscreen 20 includes a windscreen body 21 and a fixing member 22.

The windscreen body 21 covers the sound collecting part to protect the sound collecting part from the aforementioned wind, exhalation, and the like. The windscreen body 21 is made of, for example, resin having an open cell structure such as polyurethane. The windscreen body 21 has a substantially columnar shape. The shape of the windscreen body 21 will be described in detail below. The windscreen body 21 includes a notch groove 21a and the insertion hole 21h.

The notch groove 21a defines an air layer to reduce pop noise. The notch groove 21a is disposed on the outer peripheral surface of the upper part of the windscreen body 21 around the entire circumference in a ring shape along the circumferential direction of the outer peripheral surface of the upper part of the windscreen body 21.

The insertion hole 21h is a columnar hole to which the upper end part of the microphone 10 (a part of the unit part 11) is inserted. The insertion hole 21h is disposed on the lower end surface of the windscreen body 21, being open to the lower end surface of the windscreen 21. The bottom part of the insertion hole 21h (the upper end surface of the insertion hole 21h) is disposed substantially on the central part of the windscreen body 21 in the up-down direction (the longitudinal direction of the windscreen body 21: the up-down direction in FIG. 3). The opening of the insertion hole 21h is disposed on the lower end surface of the windscreen body 21 in the up-down direction.

The outer diameter of the windscreen body 21 is configured to decrease (be reduced) toward the lower end part from the central part in the longitudinal direction (the up-down direction in FIG. 3) of the windscreen body 21. That is, the outer peripheral surface of the windscreen body 21 is inclined to the center of the windscreen body 21 in the radial direction toward the lower end part from the central part (toward the opening side from the bottom part side of the insertion hole 21h) in the up-down direction.

Note that the shape of the windscreen body is not limited to the present embodiment. That is, for example, the outer peripheral surface of the windscreen body may be inclined toward the lower end part side from the upper end part side in the up-down direction, or may not be inclined (i.e., may have a columnar shape).

Figure 4:
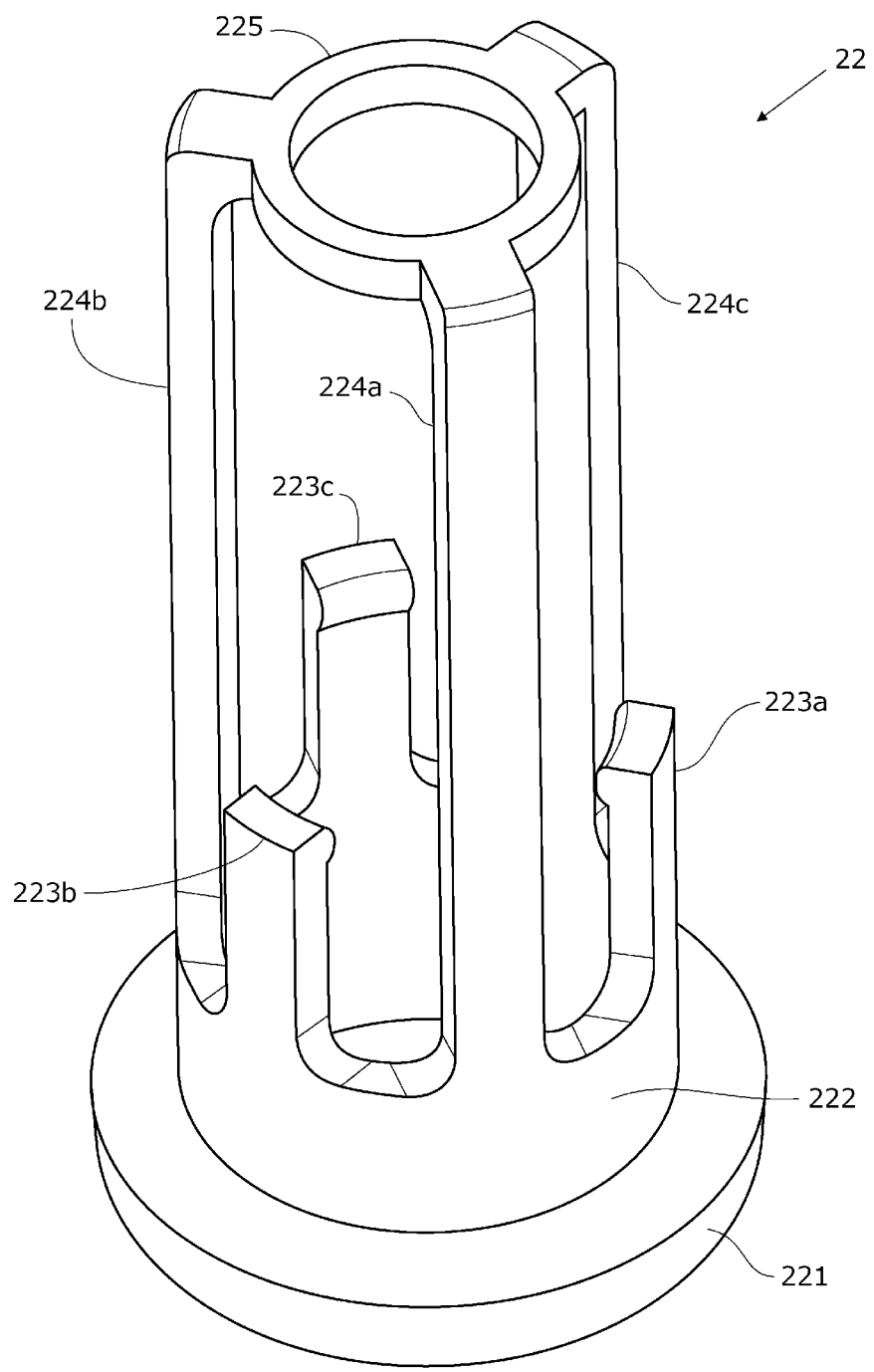
FIG. 4 is a perspective view of a fixing member included in the windscreen in FIG. 3.

FIG. 4 is a perspective view of the fixing member 22.

The fixing member 22 fixes the windscreen body 21 to the microphone 10 (second case 112). The fixing member 22 is made of, for example, a translucent resin such as polymethyl methacrylate (PMMA). The fixing member 22 includes a light guide part 221, a support part 222, three fitting parts 223a, 223b and 223c, three coupling parts 224a, 224b and 224c, and a spacer 225. The support part 222, the fitting parts 223a-223c, the coupling parts 224a-224c, and the spacer 225 constitute a positioning part in the present invention. That is, the fixing member 22 includes the positioning part, and the positioning part includes a support part 222, the fitting parts 223a-223c, the coupling parts 224a-224c, and a spacer 225.

Note that the number of the fitting parts and the number of the coupling parts are not limited to "3". That is, for example, the number of the fitting parts and the number of the coupling parts may be "4" or more, or "1", or may not be the same.

The light guide part 221 guides the light from the light emitting display part 116 (see FIG. 2). The light guide part 221 has a ring shape.

The outer diameter of the upper end part of the light guide part 221 is the same as the outer diameter of the lower end part of the windscreen body 21, as illustrated in FIG. 3. The outer diameter of the light guide part 221 is configured to continuously decrease (be reduced) from the upper end part toward the lower end part of the light guide part 221. That is, the outer peripheral surface of the light guide part 221 is inclined to the center of the light guide part 221 in the radial direction toward the lower end part from the upper end part in the up-down direction. The inclination angle of the outer peripheral surface of the light guide part 221 to the up-down direction is the same as the inclination angle of the outer peripheral surface of the lower end part of the windscreen body 21 to the up-down direction. The inner diameter of the light guide part 221 is substantially the same as the outer diameter of each of the upper end parts of the first case 111, the second case 112, and the third case 113 (the inner diameter of the light guide part 221 is slightly larger than the outer diameter of each of the case 111, 112 and 113).

An inclination of the outer peripheral surface of the light guide part 221 is continuous with an inclination of the outer peripheral surface of the windscreen body 21 in the up-down direction (the longitudinal direction of the windscreen body 21). In other words, the light guide part 221 includes an outer peripheral surface continuous with the outer peripheral surface of the windscreen body 21 in the up-down direction.

Note that the outer diameter of the light guide part is not limited to this embodiment. That is, for example, the outer diameter of the light guide part may be larger than the outer diameter of the windscreen body, or may be smaller than the outer diameter of the windscreen body.

Further, the outer peripheral surface of the light guide part may not be continuous with the outer peripheral surface of the windscreen body in the up-down direction. That is, for example, the outer peripheral surface of the light guide part, in the up-down direction, may not be inclined, or may be inclined at an inclination angle different from the inclination angle of the outer peripheral surface of the windscreen body with respect to the up-down direction.

A length L2 of the light guide part 221 in the up-down direction is longer than a length L1 of the light emitting display part 116 in the up-down direction (see FIG. 2).

The inner edge part of the upper surface of the light guide part 221 extends upward to constitute the support part 222 having a cylindrical shape. The support part 222 supports the fitting parts 223a-223c and the coupling parts 224a-224c. The inner diameter of the support part 222 is the same as the inner diameter of the light guide part 221. The outer diameter of the support part 222 is smaller than the outer diameter of the light guide part 221, and larger than the inner diameter of the insertion hole 21h (see FIG. 3).

A part of the upper surface of the support part 222 extends upward to constitute the fitting parts 223a-223c having a columnar shape. The fitting parts 223a-223c fit into the fitting groove 112a of the second case 112. The fitting parts 223a-223c are disposed at an equal angular interval (at the interval of 120 degrees in this embodiment) in the circumferential direction of the support part 222. The upper end parts of the fitting parts 223a-223c project toward the center of the support part 222 in the radial direction.

Another part of the upper surface of the support part 222 extends upward to constitute the coupling parts 224a-224c having a columnar shape. The coupling parts 224a-224c couple the light guide part 221 with the spacer 225 via the support part 222. The length of the coupling parts 224a-224c in the up-down direction is longer than the length of the fitting parts 223a-223c in the up-down direction. The coupling parts 224a-224c are disposed between the fitting parts 223a-223c at an equal angular interval (at the interval of 120 degrees in this embodiment) in the circumferential direction of the support part 222.

Each of the upper ends of the coupling parts 224a-224c is bent and coupled to the center of the support part 222 in the radial direction to constitute a spacer 225 having a ring shape. The spacer 225 defines a gap between the bottom part (bottom surface) of the insertion hole 21h and the upper surface of the first case 111 (the upper end surface of the microphone 10), as illustrated in FIG. 2.

As described above, the positioning part (the support part 222, the fitting parts 223a-223c, and the coupling parts 224a-224c) is integrally formed with the light guide part 221.

Assembly of Microphone Device

Figure 5:
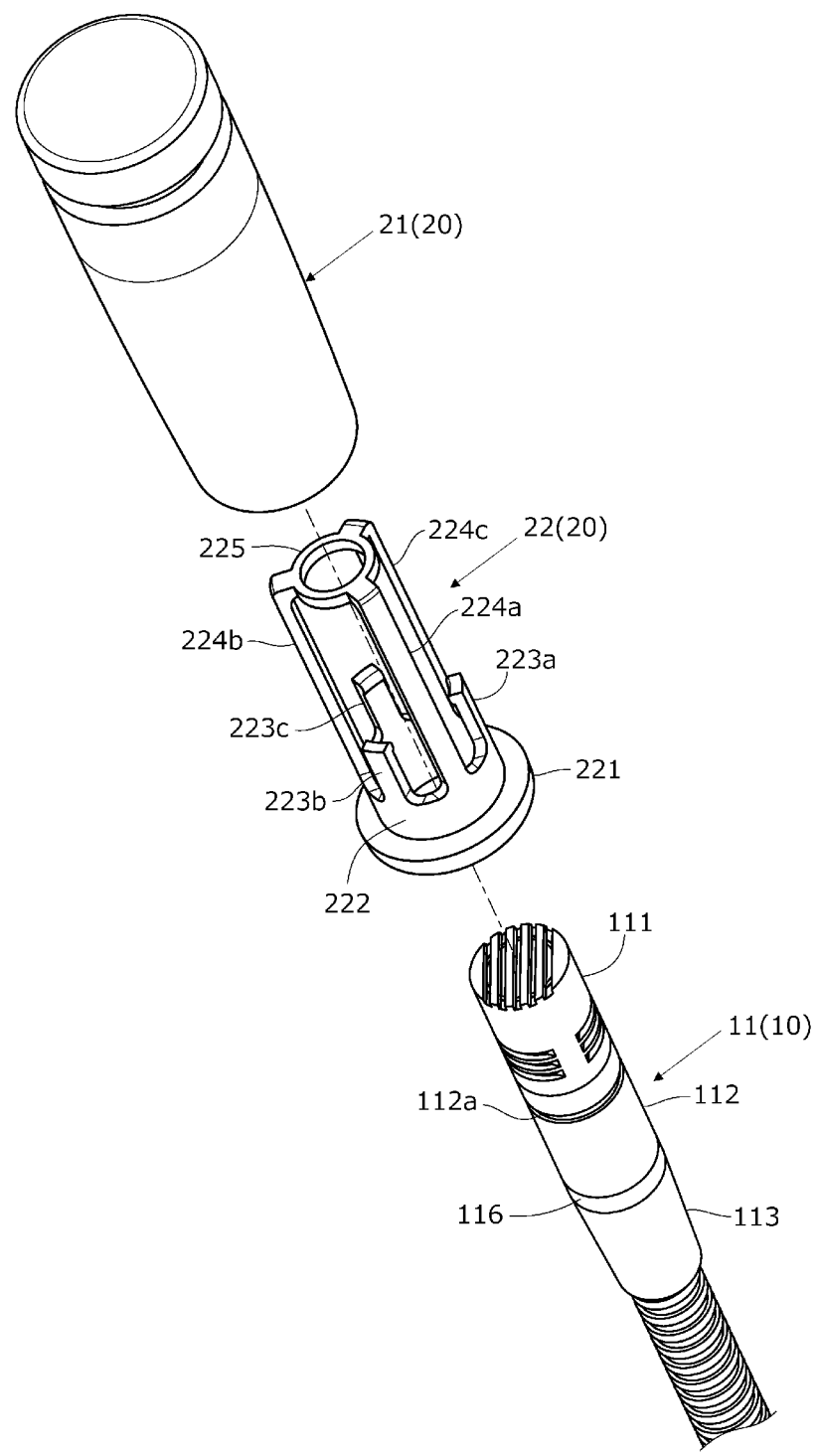
FIG. 5 is an exploded perspective view of the microphone device in FIG. 1.

FIG. 5 is an exploded perspective view of the microphone device 1.

First, the fixing member 22 is attached to the windscreen body 21. The positioning part (the support part 222, the fitting parts 223a-223c, and the coupling parts 224a-224c) of the fixing member 22 is inserted into the insertion hole 21h (see FIG. 3) and disposed inside the insertion hole 21h. The light guide part 221 of the fixing member 22 is disposed outside the insertion hole 21h. The lower end surface of the windscreen body 21 abuts against the upper surface of the light guide part 221. At this stage, the insertion hole 21h is enlarged in diameter by the positioning part. The windscreen body 21 is attached to the fixing member 22 with, for example, an adhesive.

The windscreen 20 is then attached to the unit part 11 of microphone 10. The microphone 10 is inserted into the insertion hole 21h (inside the fixing member 22) from the upper end side. That is, the unit part 11 of the microphone 10 is inserted into the insertion hole 21h (inside the fixing member 22).

When the first case 111 and the second case 112 of the unit part 11 are inserted into the insertion hole 21h (inside the fixing member 22), the upper end parts of the fitting parts 223a-223c of the fixing member 22 are fitted into the fitting groove 112a of the second case 112. As a result, the windscreen 20 is fixed to the microphone 10. At this stage, the sound collecting part is disposed in the insertion hole 21h.

Figure 6:
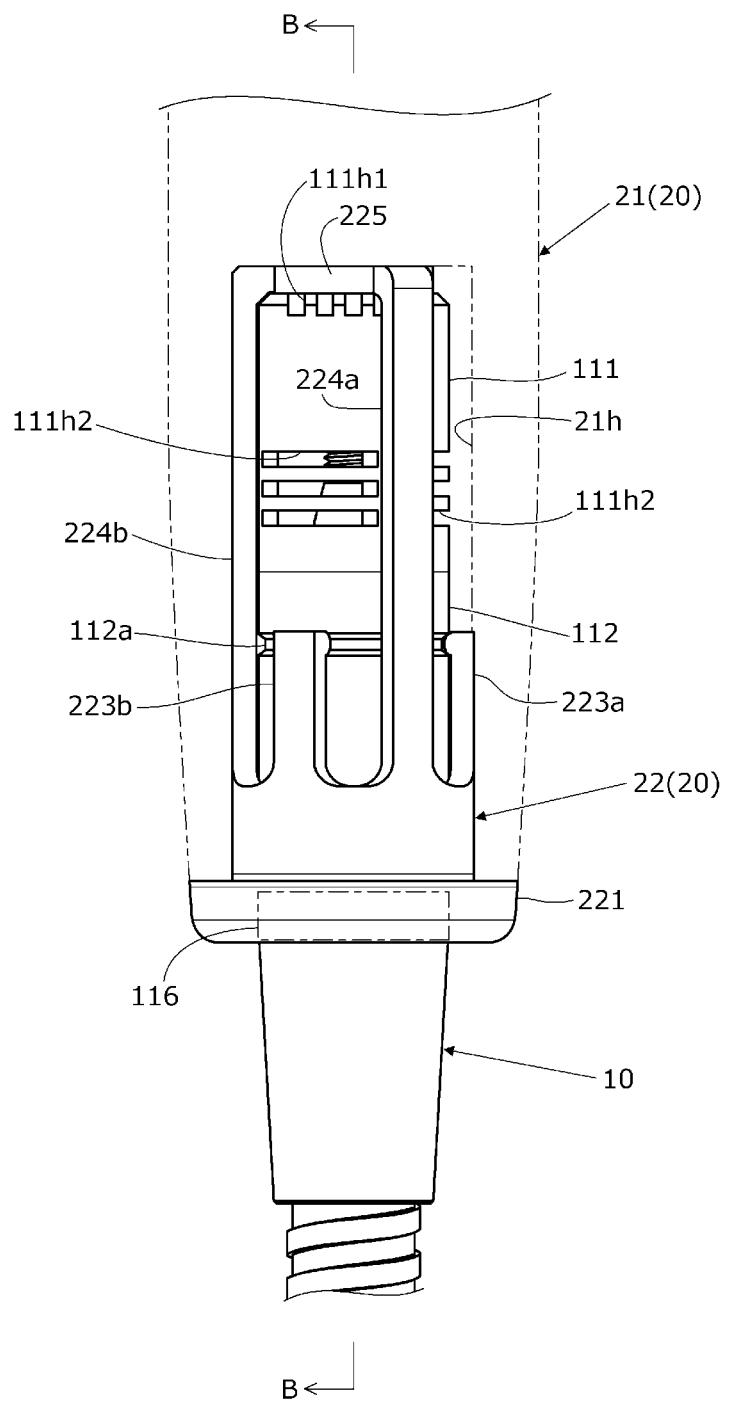
FIG. 6 is a schematic view illustrating a positional relationship between a microphone and the windscreen when the windscreen in FIG. 3 is mounted on the microphone included in the microphone device in FIG. 1.

FIG. 6 is a schematic diagram illustrating the positional relationship between the microphone 10 and the windscreen 20 when the windscreen 20 is mounted on the microphone 10. FIG. 6 illustrates the windscreen body 21 with a two-dot chain line, and the light emitting display part 116 with a dashed line.

When the windscreen 20 is fixed to the microphone 10, the light guide part 221 is positioned on the light emitting display part 116 in the up-down direction (the up-down direction in FIG. 6). That is, the positioning part positions the light guide part 221 to the light emitting display part 116. As a result, the light guide part 221 covers the entire surface of the light emitting display part 116.

Further, when the windscreen 20 is fixed to the microphone 10, the upper end surface of the microphone 10 (the bottom part of the first case 111) abuts against the spacer 225. As a result, the spacer 225 of the positioning part is disposed between the bottom part (bottom surface) of the insertion hole 21h and the upper end surface of the microphone 10. At this stage, the spacer 225 is disposed at a position where the spacer 225 does not close the first sound wave introduction ports 111h1 of the first case 111.

The support part 222, the fitting parts 223a-223c, and the coupling parts 224a-224c of the positioning part are disposed between the first case 111, the second case 112, and the inner peripheral surface of the insertion hole 21h. In this state, the coupling parts 224a-224c are disposed between the second sound wave introduction ports 111h2 in the radial direction of the microphone 10. That is, the coupling parts 224a-224c are disposed at positions where the coupling parts 224a-224c do not close the second sound wave introduction ports 111h2.

Thus, the positioning part is disposed between the inner surface of the insertion hole 21h and the outer surface (upper end surface and outer peripheral surface) of the unit part 11 of the microphone 10 to define a gap therebetween, as also illustrated in FIG. 2. This gap constitutes an air layer to reduce pop noise. Therefore, the generation of the pop noise at the sound collecting part caused by the wind from the outside of the microphone device 1 or the exhalation of the user (speaker) of the microphone device 1 is suppressed.

When the windscreen 20 is pulled upward with respect to the microphone 10 in a state in which the fitting parts 223a-223c are fitted into the fitting groove 112a, the fitting groove 112a and the fitting parts 223a-223c are released, and the windscreen 20 is removed from the microphone 10. That is, the windscreen 20 is removable with respect to the microphone 10.

Operation of Microphone Device

Figure 7:
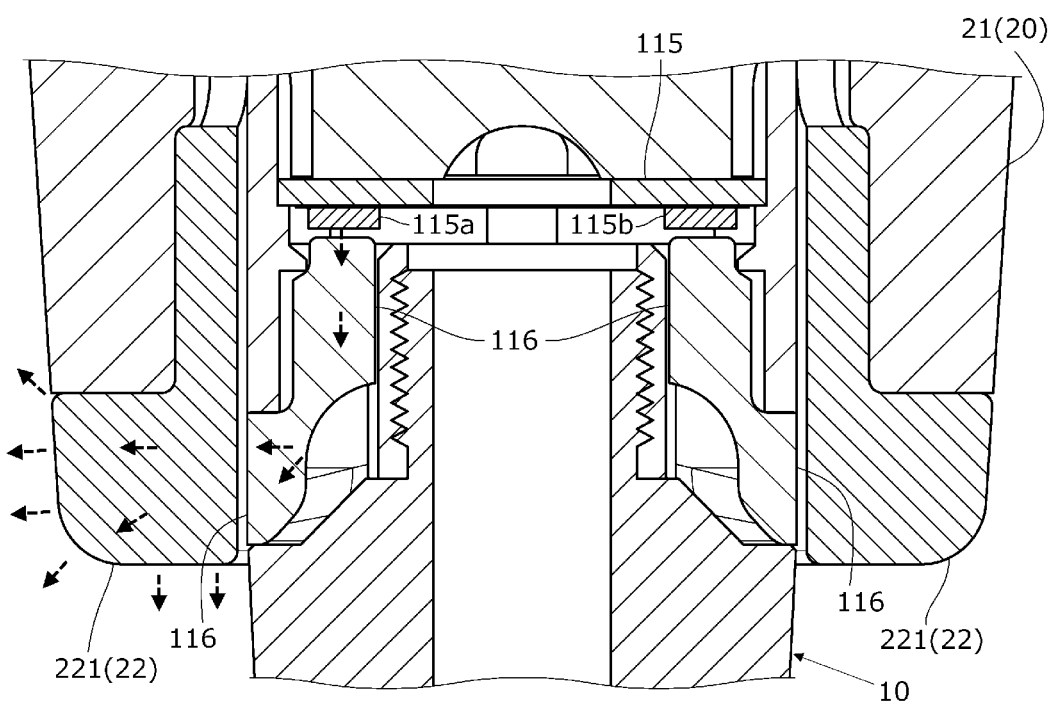
FIG. 7 is a partially enlarged cross-sectional view of the microphone device taken along line B-B in FIG. 6.

FIG. 7 is a partially enlarged cross-sectional view of the microphone device 1 taken along line B-B in FIG. 6.

FIG. 7 illustrates a state in which light from LED 115a is guided with a dashed line arrow.

When the power of the microphone device 1 is turned on by the user of the microphone device 1, the microphone unit 114 (sound collecting part) (see FIG. 2) can collect sound, and the LEDs 115a and 115b emit light (are lighted). The light from the LEDs 115a and 115b is diffused inside the light emitting display part 116 and guided to the light emitting display part 116. The light guided from the LEDs 115a and 115b to the light emitting display part 116 is radiated from the light emitting display part 116 to the outside of the microphone 10.

The light radiated from the light emitting display part 116 is incident on the light guide part 221. The light incident on the light guide part 221 is diffused into the interior of the light guide part 221, and radiated from the outer peripheral surface and the lower surface of the light guide part 221 to the outside of the light guide part 221. That is, the visibility of the light from the LEDs 115a and 115b is good within an area from the radial direction of the light guide part 221 (e.g., the left-right direction in FIG. 7) to the downward direction of the light guide part 221 (the downward direction in FIG. 7). As a result, a person who visually recognizes the microphone device 1 from a direction in which the outer peripheral surface or the lower surface of the light guide part 221 is directed can easily recognize the operation state of the microphone device 1 (sound collecting part).

As described above, the outer diameter of the upper end part of the light guide part 221 is the same as the outer diameter of the lower end part of the windscreen body 21. The outer peripheral surface of the light guide part 221 is continuous with the outer peripheral surface of the windscreen body 21 in the up-down direction. Therefore, the user (speaker) of the microphone device 1 can easily visually recognize a part of the light guide part 221 by simply shifting the line of sight (viewing axis) from the sound collecting axis of the microphone device 1.

Figure 8:
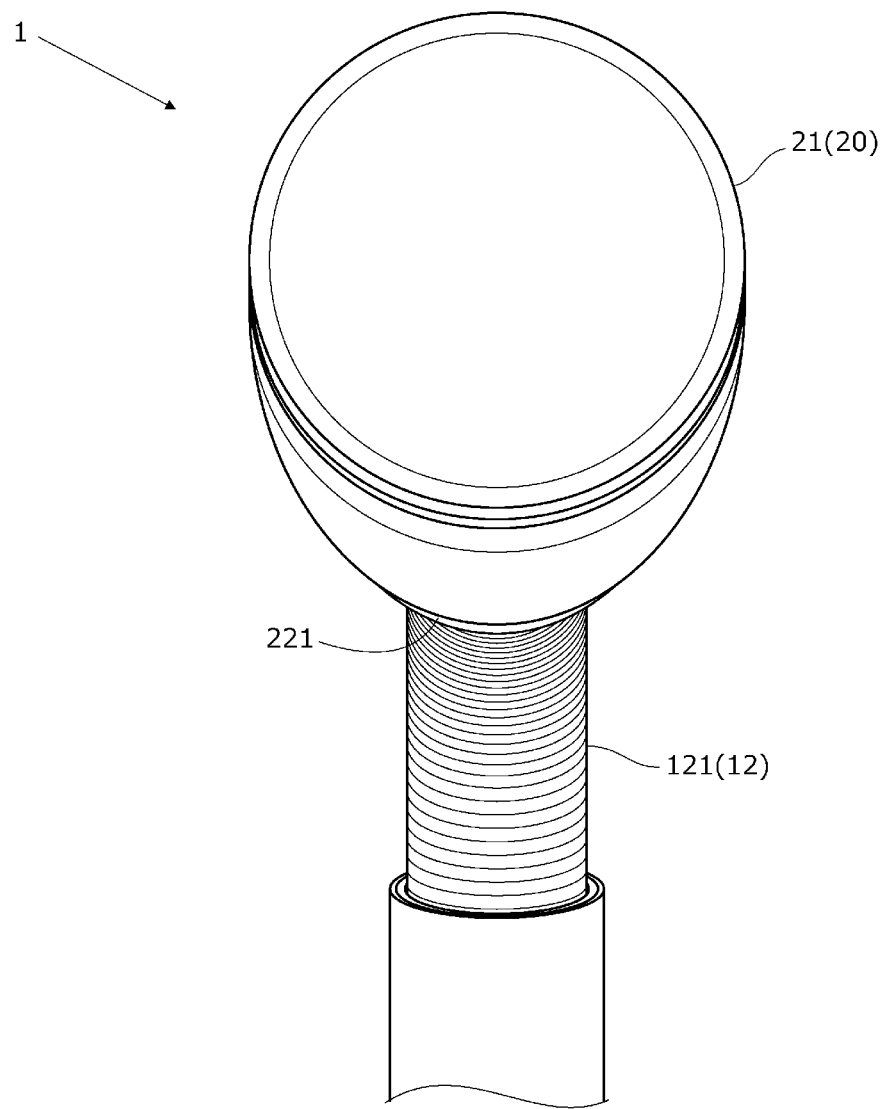
FIG. 8 is an external view illustrating a use state of the microphone device in FIG. 1.

FIG. 8 is an external view illustrating a use state of the microphone device 1.

FIG. 8 illustrates, for example, a state in which the user of the microphone device 1 bends the first flexible pipe 121 in his/her own direction to visually recognize the upper end of the microphone device 1 (the upper end of the windscreen 20). FIG. 8 illustrates that a part of the light guide part 221 is visually recognized by the user in a crescent shape, and the operation state of the microphone device 1 is recognizable to the user.

CONCLUSION

According to the embodiment described above, the windscreen 20 is disposed outside the insertion hole 21h of the windscreen body 21 to cover the light emitting display part 116, and includes a light guide part 221 for guiding light from the light emitting display part 116 to the outside. Therefore, the windscreen 20 does not inhibit (does ensure) the visibility of the light from the light emitting display part 116 of the microphone 10 in a state of being attached to the microphone 10. That is, the visibility of the light from the light emitting display part 116 in the microphone device and the windscreen according to the present invention is good.

Further, according to the embodiment described above, the length L2 of the light guide part 221 in the up-down direction is longer than the length L1 of the light emitting display part 116 in the up-down direction. Therefore, the radiation area of the light from the LEDs 115a and 115b is wider as compared with when the light emitting display part 116 alone radiates the light. As a result, the visibility of the light from the LEDs 115a and 115b is improved.

Furthermore, according to the embodiment described above, the light guide part 221 has a ring shape, and the outer diameter of the light guide part 221 is equal to or smaller than the outer diameter of the windscreen body 21. Therefore, the area of the light guide part 221 visually recognized by the speaker is limited. That is, the amount of light guided toward an eye of the user of the microphone device 1 is limited. Consequently, the speaker can visually recognize the operation state of the microphone 10 without feeling dazzle due to the light (light emitted by the light guide part 221) from the LEDs 115a and 115b.

Furthermore, according to the embodiment described above, the light guide part 221 includes an outer peripheral surface continuous with the outer peripheral surface of the windscreen body 21 that is inclined in the up-down direction. As a result, the windscreen 20 has a good design and a good visibility of light.

Furthermore, according to the embodiment described above, the windscreen 20 includes the positioning part that positions the light guide part 221 on the light emitting display part 116. Therefore, the user of the microphone device 1 can easily cover the light emitting display part 116 with the light guide part 221.

Furthermore, according to the embodiment described above, the positioning part includes the fitting parts 223a-223c that are fitted into the fitting groove 112a disposed on the outer peripheral surface of the microphone 10. The fitting between the fitting parts 223a-223c and the fitting groove 112a is released by pulling the windscreen 20 upward with respect to the microphone 10. Therefore, the windscreen 20 is easily fixed (mounted) to the microphone 10 and is easily removable from the microphone 10.

Furthermore, according to the embodiment described above, the positioning part includes the coupling parts 224a-224c and the spacer 225 disposed between the inner peripheral surface of the insertion hole 21h and the outer surface of the microphone 10. Therefore, the windscreen 20 defines the air layer that reduces pop noise between the windscreen 20 and the microphone 10 in a state of being attached to the microphone 10, while ensuring the visibility of light from the light emitting display part 116.

Furthermore, according to the embodiments described above, the windscreen 20 is attachable to and detachable from the microphone 10. Therefore, the design of the microphone 10 itself is ensured by removing the windscreen 20 from the microphone 10. The speaker can also select the presence or absence of the windscreen 20.

As described above, the fixing member 22 that fixes the windscreen body 21 to the microphone 10 radiates the light from the light emitting display part 116 to the outside, and accordingly the microphone device according to the present invention can indicate the operation state of the microphone device 1 (the sound collecting part). That is, the fixing member 22 has a function of fixing the windscreen body 21 to the microphone 10, and a function of indicating the operation state of the sound collecting part. As a result, the number of components of the microphone device according to the present invention is less than the number of components of a conventional microphone device including a light guide part for guiding light from a light emitting part separately from the fixing member.

Further, the microphone device and the windscreen according to the present invention do not inhibit the miniaturization and design of the microphone 10, since the light guide part 221 achieves the same function as enlarging the light emitting display part 116 in diameter.

Note that, according to the embodiment described above, the fixing member 22 includes the coupling parts 224a-224c and the spacer 225. Alternatively, the fixing member according to the present invention may be configured to include only the fitting part. In this case, the fixing member according to the present invention can also be used for a windscreen body of a microphone such as a gun microphone having a long sound collecting part. That is, the fixing member according to the present invention can be shared among a plurality of windscreen bodies.

The invention claimed is:

1. A windscreen attached to a microphone comprising a sound collecting part configured to collect sound and a light emitting part configured to indicate an operation state of the sound collecting part, the windscreen comprising:
   a windscreen body that covers the sound collecting part; and
   a fixing member that fixes the windscreen body to the microphone, wherein
   the windscreen body includes an insertion hole in which the sound collecting part is disposed,
   the fixing member includes a light guide part that is disposed outside the insertion hole, and
   the light guide part that guides light from the light emitting part.

2. The windscreen according to claim 1, wherein the light guide part covers the light emitting part.

3. The windscreen according to claim 2, wherein a length of the light guide part in a longitudinal direction of the windscreen body is longer than a length of the light emitting part in a longitudinal direction of the microphone.

4. The windscreen according to claim 2, wherein the light guide part has a ring shape.

5. The windscreen according to claim 1, wherein the light guide part includes an outer peripheral surface that is continuous with the outer peripheral surface of the windscreen body in the longitudinal direction of the windscreen body.

6. The windscreen according to claim 5, wherein the outer peripheral surface of the windscreen body is inclined toward an opening side of the insertion hole from a bottom part side of the insertion hole in the longitudinal direction of the windscreen body.

7. The windscreen according to claim 5, wherein the light from the light emitting part is radiated from the outer peripheral surface and a lower surface of the light guide part to the outside of the light guide part.

8. The windscreen according to claim 1, wherein
the fixing member includes a positioning part that is disposed within the insertion hole, and
the positioning part positions the light guide part to the light emitting part.

9. The windscreen according to claim 8, wherein the positioning part includes a fitting part that fits into a fitting groove disposed on an outer peripheral surface of the microphone.

10. The windscreen according to claim 1, wherein the fixing member is attachable to and detachable from the microphone.

11. A microphone device comprising:
a sound collecting part configured to collect sound;
a light emitting part configured to indicate an operation state of the sound collecting part; and
a windscreen that covers the sound collecting part and the light emitting part, wherein
the windscreen is a windscreen according to claim 1.

* * * * *